Oct. 26, 1965 S. WAY ETAL 3,214,616
MAGNETOHYDRODYNAMIC GENERATOR
Filed July 13, 1962
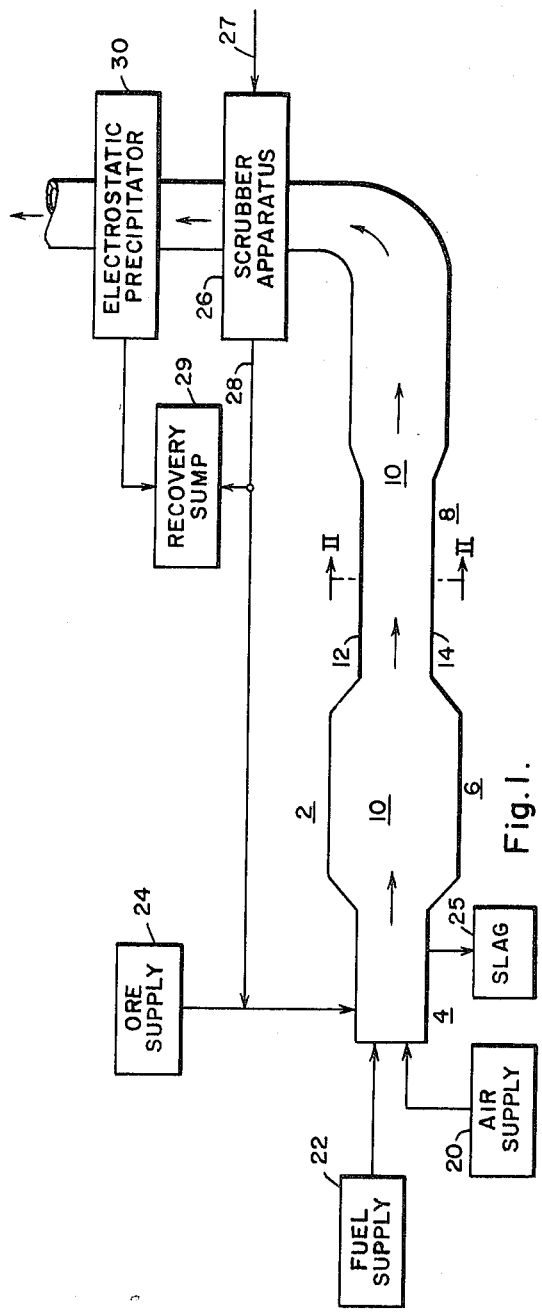
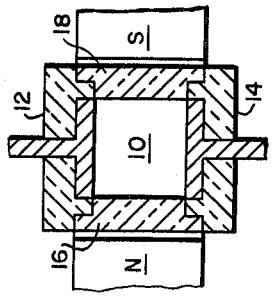
WITNESSES:
Bernard R. Gregory
James F. Young
INVENTORS
Stewart Way and
Richard L. Hundstad.
BY
ATTORNEY

United States Patent Office 3,214,616
Patented Oct. 26, 1965

3,214,616
MAGNETOHYDRODYNAMIC GENERATOR
Stewart Way, Churchill Boro, and Richard L. Hundstad, Forest Hills, Pa., assignors to Westinghouse Electric Corporation, East Pittsburgh, Pa., a corporation of Pennsylvania
Filed July 13, 1962, Ser. No. 209,531
3 Claims. (Cl. 310—11)

The present invention relates to thermal to electrical energy conversion apparatus, and more particularly to apparatus for thermal to electrical energy conversion utilizing magnetohydrodynamic techniques.

The conventional process of generating electrical energy comprises moving metallic conductors through a magnetic field. Generally, the energy conversion is from thermal to mechanical to electrical energy. Electrical energy can also be generated by moving fluid conductors in a magnetic field. However, to have a direct conversion from thermal to electrical energy, it is necessary to use a gas in order to realize an appreciable volume change. Large quantities of electrical energy may be efficiently generated through the use of magnetohydrodynamic (MHD) techniques. A magnetohydrodynamic generator utilizes an electrically conducting working fluid, which may be an inert gas or a combustion product gas, which is heated to a high enough temperature to be thermally ionized. The ionized gas is passed through a duct across which a magnetic field is established transverse to the flow of working fluid. Current is collected by electrodes disposed transversely to the magnetic field and the gas flow.

The general theory and operation of the MHD generator is fully described in a copending application entitled Magnetohydrodynamic Generator Apparatus Serial No. 202,714, filed on June 15, 1962, by Stewart Way and assigned to the same assignee as the present invention. As disclosed in that application, to have an efficient cycle of operation, it is necessary that the thermally ionized gas be maintained at a relatively high level of electrical conductivity. To increase the conductivity of the working fluid, therefore, it is usually seeded with an easily ionizable alkali metal, such as sodium, potassium, rubidium, or cesium. The best of these elements is cesium because it has the lowest ionization potential. The conductivity obtained with cesium seeding is more than twice that realized from potassium and the ratio is even greater for other elements. The main disadvantage of using cesium as a seeding material is the high cost of cesium and cesium salts. A portion of the seeding material may be recovered and recirculated through the generator, but a certain amount of the seeding material is lost on each cycle and must be made up, so that the use of an expensive material such as cesium involves an undesirably high cost.

It is therefore an object of the present invention to provide a new and improved magnetohydrodynamic generator in which an economical seeding material is utilized in conjunction with combustion product gases.

It is a further object of the present invention to provide a new and improved magnetohydrodynamic generator in which cesium seeding is used but in which the cost of seeding is substantially less than has heretofore been possible.

More specifically, the present invention provides a magnetohydrodynamic generator in which a cesium ore is utilized as the seeding material and reaction products of higher cesium content are recovered for re-use or as a by-product of the energy conversion process.

These and other objects will become more apparent when considered in view of the following specification and drawing, in which:

FIGURE 1 is a schematic diagram showing a magnetohydrodynamic generator utilizing the teachings of the present invention; and FIG. 2 is a sectional view taken at line II—II of FIG. 1.

As previously indicated, cesium is the best seeding material for a magnetohydrodynamic generator because of its low ionization potential. Cesium is an expensive material, however, and its use greatly increases the cost of operation of an MHD generator. In accordance with the present invention, it is proposed to use as a seeding material a cesium ore which is relatively inexpensive as compared to pure cesium or commercially available cesium compounds. The ore from which cesium is usually obtained is pollucite, which is a natural mineral consisting essentially of a cesium aluminum silicate, and containing usually from 20% to 30% cesium. While the chemical composition of pollucite may vary to some extent, a typical composition is as follows:

| | Percent |
|---|---|
| Cesium oxide ($Cs_2O$) | 27.20 |
| Rubidium oxide ($Rb_2O$) | 1.26 |
| Lithium oxide ($Li_2O$) | 0.36 |
| Potassium oxide ($K_2O$) | 1.14 |
| Sodium oxide ($Na_2O$) | 1.67 |
| Calcium oxide (CaO) | 0.10 |
| Magnesium oxide (MgO) | 0.01 |
| Ferric oxide ($Fe_2O_3$) | 0.10 |
| Aluminum oxide ($Al_2O_3$) | 17.40 |
| Phosphorous pentoxide ($P_2O_5$) | 0.38 |
| Silica ($SiO_2$) | 48.47 |
| Carbon dioxide, combined water, and elements undetected (by difference) ($CO_2H_2O$) | 1.91 |
| | 100.00 |

This analysis is given only by way of example of one suitable material, and other ores or materials rich in cesium or other alkali metals might also be used.

Referring now to the drawing, there is shown schematically a typical magnetohydrodynamic generator system suitable for the present invention. The generator system includes a combustion chamber 4, a mixing chamber 6, and a generator section 8 comprising a duct 10 through which the hot combustion gases formed in the combustion chamber 4 pass. The duct 10 has current collecting electrodes 12 and 14, disposed at the top and bottom, and made of any suitable refractory conducting material. The electrodes may be continuous electrodes, as shown, or they may be divided into separated sections if desired. Insulating side walls 16 and 18 form the sides of the duct and may be made of or lined with a refractory insulating material such as a suitable ceramic. A transverse magnetic field extending across the duct is maintained by any suitable means, indicated diagrammatically by the magnetic pole members N and S.

Oxygen for combustion is introduced through a suitable orifice into the combustion chamber 4 from the supply 20, preferably as compressed and preheated air. Through another suitable orifice fuel is supplied to the combustion chamber 4 from the fuel supply 22. Any suitable fuel may be used such as a hydrocarbon fuel which might be propane or diesel fuel, for example. The fuel is burned in the combustion chamber at a high temperature and the combustion product gases, which include carbon dioxide, water vapor, and possibly other gases, pass from the mixing chamber to the duct 10 and flow through the duct. The gas flowing through the duct is at a high enough temperature to be ionized and the flow of conductive gas through the transverse magnetic field generates electrical energy which is available at the electrodes.

For efficient operation, the electrical conductivity of the gas must be relatively high and it is not practical to rely on thermal ionization alone to obtain the desired conductivity. For this reason, it is necessary to seed the gas with an easily ionizable material to increase the amount of ionization and thus increase the conductivity. The alkali metals are the most suitable materials for this purpose because they have relatively low ionization potentials and thus are easily ionized. Cesium is the best of the alkali metals for seeding purposes, since it has the lowest ionization potential, but it is quite expensive and its use in the form of commercially available compounds considerably increases the cost of operation. As previously indicated, therefore, in accordance with the present invention, cesium is provided for seeding in the form of an ore, preferably pollucite which as described above contains from 20% to 30% cesium. This material is relatively inexpensive and the cost per pound of cesium contained in the ore is a small fraction of the cost of cesium in commercially available compounds such as the carbonate.

The pollucite ore in finely divided or powdered form is provided from a supply 24 through a suitable orifice to the combustion chamber 4. The powdered ore may be introduced into the combustion chamber by entrainment of the powder in a gas stream, or in the form of a slurry, as well known in the art of handling pulverized materials. The ore decomposes at the high temperature in the combustion chamber and the cesium reacts with the combustion products to form cesium carbonate. The alumina and silica in the ore form a slag which can be at least partially removed from the combustion chamber, as indicated at 25, or otherwise disposed of in any desired manner. The ionized gas from the combustion chamber, containing the cesium carbonate, passes through the duct 10 as previously described and may be discharged to a stock. The heat remaining in the gas may be used in known manner to preheat the air for the combustion chamber or for other purposes. Before being discharged, the seeding material is removed from the gas by any suitable means such as a scrubber apparatus 26 which washes the cesium carbonate from the gas. The scrubber apparatus 26 may be of the well known water-spray type in which water is introduced at the input 27 and is sprayed through the gas. The cesium carbonate is dissolved in the water and the resulting solution passes out from the outlet 28. A portion of the collected cesium carbonate solution may be collected in the recovery sump 29 where the water can be removed. The remainder of the cesium carbonate is returned into the cycle, as shown, to be used as the main supply of seeding material for the generator. Any cesium compounds remaining in the gas flow after the gas passes through the scrubber 26 may be collected in the electrostatic precipitator 30. Such precipitators are well known in the art and the cesium containing compounds are separated from the gas by electrostatic forces. The cesium collected by the precipitator 30 is then fed into the recovery sump 29. This material collected in sump 29 may, of course, also be used to augment the seeding stream.

The use of pollucite, or other relatively inexpensive cesium ore, as a seeding material thus substantially reduces the cost of operation of a magnetohydrodynamic generator, as compared to the cost if cesium itself is used. The use of pollucite makes it possible to recover cesium compounds of much higher cesium content than the original ore and the recovered compounds can be recycled through the generator to reduce the amount of seeding material required. Thus after a period of initial operation, if the recovery apparatus is reasonably efficient, the recovered cesium carbonate will be sufficient to provide most of the seeding material required, and it will be necessary to continuously add only the relatively small amount of pollucite necessary to make up for the cesium which passes through the recovery apparatus and is lost. The desired seeding of the gas is thus obtained at low cost.

The recovery of cesium compounds of higher cesium content than the original ore also makes possible a still more economical type of operation. If the amount of pollucite continuously fed to the generator is in excess of that actually needed, the amount of cesium carbonate recovered will be more than is needed for recycling and an excess of cesium carbonate is obtained. This material has other commercial uses as a source of cesium and is readily salable at a price substantially higher than the price of pollucite. Thus the MHD generator is, in effect, used for refining cesium ore and the excess cesium compounds recovered are a valuable by-product of the generator operation which can substantially reduce the net cost of operation. It will be obvious that the amount of seeding can be controlled by controlling the amount of cesium carbonate recycled and the amount of pollucite supplied. Relatively high levels of seeding can be economically obtained, the amount of seeding or the amount of cesium recovered, being limited only by the ability of the combustion gas to entrain the cesium carbonate and carry it through the generator. The high level of seeding thus obtainable result in high electrical conductivity of the gas and makes possible efficient operation at a lower gas temperature than would otherwise be necessary.

Although the present invention has been described with a certain degree of particularity, it should be understood that the present disclosure has been made by way of example and that numerous changes in the details of construction, the materials used and the combination and arrangement of parts may be resorted to without departing from the scope and spirit of the present invention.

We claim as our invention:

1. A magnetohydrodynamic generator system including duct means, means for producing a magnetic field transverse to said duct means, electrode means at opposite sides of the duct means, combustion means adjacent one end of the duct means for producing a stream of high temperature, thermally ionized gas to flow through the duct means, means for feeding pollucite ore into the gas stream adjacent said end of the duct means, and means adjacent the other end of the duct means for removing from the gas stream reaction products of said cesium having a higher content of the cesium than said pollucite.

2. A magnetohydrodynamic generator system including duct means, means for producing a magnetic field transverse to said duct means, electrode means at opposite sides of the duct means, combustion means adjacent one end of the duct means for producing a stream of high temperature, thermally ionized gas to flow through the duct means, means for feeding a mineral containing cesium into the gas stream adjacent said end of the duct means, and means adjacent the other end of the duct means for removing from the gas stream a cesium compound having a higher cesium content than said mineral.

3. A magnetohydrodynamic generator system including duct means, means for producing a magnetic field transverse to said duct means, electrode means at opposite sides of the duct means, combustion means adjacent one end of the duct means for producing a stream of high temperature, thermally ionized gas to flow through the duct means, means for feeding a mineral containing cesium into the gas stream adjacent said end of the duct means, means adjacent the other end of the duct means for removing from the gas stream a cesium compound having a higher cesium content than said mineral, and means for returning at least a part of said cesium compound to the first-mentioned end of the duct means and feeding it into the gas stream.

References Cited by the Examiner
UNITED STATES PATENTS
2,972,228   2/61   Jensen _____ 60—39.05

OTHER REFERENCES

MHD Generators by Way; Westinghouse Engineer, July 1960, pp. 105–107.

ORIS L. RADER, *Primary Examiner.*

DAVID X. SLINEY, *Examiner.*